United States Patent
Kench et al.

(10) Patent No.: US 10,306,559 B2
(45) Date of Patent: May 28, 2019

(54) POWER MANAGEMENT OF A GLOBAL NAVIGATION SATELLITE SYSTEM (GNSS) RECEIVER IN A TRAFFIC TUNNEL

(71) Applicant: QUALCOMM Incorporated, San Diego, CA (US)

(72) Inventors: Amol Kench, San Diego, CA (US); Gautam Nirula, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 44 days.

(21) Appl. No.: 15/429,020

(22) Filed: Feb. 9, 2017

(65) Prior Publication Data
US 2018/0227853 A1    Aug. 9, 2018

(51) Int. Cl.
*H04W 52/02* (2009.01)
*H04W 4/02* (2018.01)
*H04L 12/26* (2006.01)
*G01S 19/34* (2010.01)

(52) U.S. Cl.
CPC ......... *H04W 52/0258* (2013.01); *G01S 19/34* (2013.01); *H04L 43/16* (2013.01); *H04W 4/027* (2013.01); *Y02D 70/00* (2018.01); *Y02D 70/10* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01)

(58) Field of Classification Search
CPC combination set(s) only.
See application file for complete search history.

(56) References Cited

U.S. PATENT DOCUMENTS

| | | | |
|---|---|---|---|
| 6,078,826 A | 6/2000 | Croft et al. | |
| 6,584,331 B2 | 6/2003 | Ranta | |
| 6,853,840 B2 | 2/2005 | Najafi | |
| 7,327,245 B2* | 2/2008 | Krumm | G01W 1/17 340/501 |
| 8,374,786 B2* | 2/2013 | Buros | G01S 19/48 701/408 |
| 8,588,871 B1 | 11/2013 | Arnold | |
| 2006/0284765 A1 | 12/2006 | Bernhardt et al. | |

(Continued)

FOREIGN PATENT DOCUMENTS

| | | |
|---|---|---|
| WO | 2009074654 A1 | 6/2009 |
| WO | 2012097003 A2 | 7/2012 |

OTHER PUBLICATIONS

International Search Report and Written Opinion—PCT/US2017/066015—ISA/EPO—dated Mar. 21, 2018.

*Primary Examiner* — Ian N Moore
*Assistant Examiner* — Justin T Van Roie
(74) *Attorney, Agent, or Firm* — Thien T. Nguyen

(57) ABSTRACT

Techniques provided herein are directed toward using information from various sources to determine when the mobile device enters and exits a traffic tunnel, turning off the GNSS receiver of the mobile device when the mobile device enters the tunnel, and turning the GNSS receiver back on once it exits. For example, the mobile device can turn off the GNSS receiver based, at least in part, on a determination that the mobile device has entered the traffic tunnel, and a determined traffic tunnel length and/or estimated amount of time the mobile device will be in the traffic tunnel.

28 Claims, 6 Drawing Sheets

(56) References Cited

U.S. PATENT DOCUMENTS

2010/0255858 A1   10/2010  Juhasz
2016/0377731 A1   12/2016  Garg et al.
2017/0195953 A1*  7/2017  Amorim de Faria Cardote .......... H04L 67/12

* cited by examiner

POWER MANAGEMENT OF A GLOBAL NAVIGATION SATELLITE SYSTEM (GNSS) RECEIVER IN A TRAFFIC TUNNEL

BACKGROUND

Mobile devices are frequently used in navigation. To provide outdoor navigation, the mobile devices typically utilize a global navigation satellite system (GNSS) receiver. But in very weak or no GNSS signal environments a mobile device can consume large amounts of battery power in an attempt to acquire GNSS signals. In the case of traffic tunnels, traffic issues can cause traffic to move slowly, if at all, inside the tunnel. This can result in severe battery drain by the GNSS receiver of a mobile device while the mobile device is in a traffic tunnel.

SUMMARY

Techniques provided herein are directed toward using information from various sources to determine when the mobile device enters and exits a traffic tunnel, turning off the GNSS receiver of the mobile device when the mobile device enters the tunnel, and turning the GNSS receiver back on once it exits. For example, the mobile device can turn off the GNSS receiver based, at least in part, on a determination that the mobile device has entered the traffic tunnel, and a determined traffic tunnel length and/or estimated amount of time the mobile device will be in the traffic tunnel.

An example method of operating a global navigation satellite system (GNSS) receiver of a mobile device, according to the disclosure, comprises determining that the mobile device has entered a traffic tunnel, and turning off the GNSS receiver based, at least in part, on (i) the determination that the mobile device has entered the traffic tunnel, and (ii) a determined traffic tunnel length, or an estimated amount of time that the mobile device will be in the traffic tunnel, or a combination thereof. The method further comprises, determining that the mobile device has exited the traffic tunnel, and turning on the GNSS receiver based on the determination that the mobile device has exited the traffic tunnel.

The method can also include one or more of the following features. The determination that the mobile device has entered the traffic tunnel can be based on a determination that a GNSS signal strength received by the GNSS receiver is below a threshold signal strength level, a determined location of the mobile device with respect to map data, data received from an optical sensor, or a determined speed at which the mobile device is traveling, or any combination thereof. The determination that the mobile device has entered the traffic tunnel can be further based on the data received from the optical sensor, wherein the optical sensor comprises a camera and the data received from the optical sensor comprises an image having information indicative of a location of an entrance of the traffic tunnel. The determination that the mobile device has entered the traffic tunnel can be further based on the data received from the optical sensor, wherein the data is indicative of a change in ambient light. The method may further comprise determining the speed at which the mobile device is traveling by receiving information from a vehicle in which the mobile device is traveling, the information indicative of the speed at which the vehicle is traveling. The method may further comprise determining the speed at which the mobile device is traveling based on information obtained from an Inertial Measurement Unit (IMU), the optical sensor, or any combination thereof. Turning off the GNSS receiver can be further based on a determined average speed of traffic inside the traffic tunnel, or a frequency at which the mobile device is to provide a location fix, or any combination thereof. The determination that the mobile device has exited the traffic tunnel can be based, at least in part, on data received from an optical sensor, a location determination based on radio frequency (RF) signals received from one or more terrestrial transceivers, data received from one or more motion sensors, or any combination thereof the determination that the mobile device has exited the traffic tunnel can be further based on the data received from the optical sensor, wherein the optical sensor comprises a camera and the data received from the optical sensor comprises an image having information indicative of a location of an exit of the traffic tunnel. The determination that the mobile device has exited the traffic tunnel is further based on the data received from the optical sensor, wherein the data is indicative of a change in ambient light.

An example mobile device, according to the description, comprises a global navigation satellite system (GNSS) receiver, and a processing unit communicatively coupled with the GNSS receiver. The processing unit is configured to determine that the mobile device has entered a traffic tunnel, and cause the GNSS receiver to be turned off, based, at least in part, on (i) a determined traffic tunnel length, or an determination that the mobile device has entered the traffic tunnel, and (ii) the estimated amount of time that the mobile device will be in the traffic tunnel, or a combination thereof. The processing unit is further configured to determine that the mobile device has exited the traffic tunnel, and cause the GNSS receiver to be turned on, based on the determination that the mobile device has exited the traffic tunnel.

The mobile device may further comprise one or more of the following features. The processing unit can be configured to determine that the mobile device has entered the traffic tunnel based on a determination that a GNSS signal strength received by the GNSS receiver is below a threshold signal strength level, a determined location of the mobile device with respect to map data, data received from an optical sensor, or a determined speed at which the mobile device is traveling, or any combination thereof. The processing unit can be configured to make the determination that the mobile device has entered the traffic tunnel based on the data received from the optical sensor, wherein the optical sensor comprises a camera and the data received from the optical sensor comprises an image having information indicative of a location of an entrance of the traffic tunnel. The processing unit can be configured to make the determination that the mobile device has entered the traffic tunnel based on the data received from the optical sensor, wherein the data is indicative of a change in ambient light. The processing unit can be configured to determine the speed at which the mobile device is traveling by receiving information from a vehicle in which the mobile device is traveling, the information indicative of the speed at which the vehicle is traveling. The processing unit can be configured to determine the speed at which the mobile device is traveling based on information obtained from an Inertial Measurement Unit (IMU), the optical sensor, or any combination thereof. The processing unit can be configured to turn off the GNSS receiver further based on a determined average speed of traffic inside the traffic tunnel, or a frequency at which the mobile device is to provide a location fix, or any combination thereof. The processing unit can be configured to make the determination that the mobile device has exited the traffic tunnel based, at least in part, on data received from an optical sensor, a location determination based on radio frequency (RF) signals received from one or more terrestrial transceivers, data received from one or more motion sensors, or any combination thereof. The processing unit can be configured to make the determination that the mobile device has exited the traffic tunnel further based on the data received from the optical sensor, wherein the optical sensor comprises a camera and the data received from the optical sensor comprises an image having information indicative of a location of an exit of the traffic tunnel. The processing unit can be configured to make the determination that the mobile device has exited the traffic tunnel further based on the data received from the optical sensor, wherein the data is indicative of a change in ambient light.

An example apparatus, according to the description, comprises means for determining that a mobile device has entered a traffic tunnel, and means for turning off a global navigation satellite system (GNSS) receiver of the mobile device based, at least in part, on (i) the determination that the mobile device has entered the traffic tunnel, and (ii) a determined traffic tunnel length, or an estimated amount of time that the mobile device will be in the traffic tunnel, or a combination thereof. The apparatus further comprises means for determining that the mobile device has exited the traffic tunnel, means for turning on the GNSS receiver based on the determination that the mobile device has exited the traffic tunnel.

The apparatus may have one or more of the following features. The apparatus may further comprise means for making the determination that the mobile device has entered the traffic tunnel based on a determination that a GNSS signal strength received by the GNSS receiver is below a threshold signal strength level, a determined location of the mobile device with respect to map data, data received from an optical sensor, or a determined speed at which the mobile device is traveling, or any combination thereof. The apparatus may further comprise means for making the determination that the mobile device has entered the traffic tunnel based on the data received from the optical sensor comprising a camera, wherein the data received from the optical sensor comprises an image having information indicative of a location of an entrance of the traffic tunnel. The apparatus may further comprise means for making the determination that the mobile device has entered the traffic tunnel based on the data received from the optical sensor, wherein the data is indicative of a change in ambient light. The apparatus may further comprise means for determining the speed at which the mobile device is traveling by receiving information from a vehicle in which the mobile device is traveling, the information indicative of the speed at which the vehicle is traveling.

A non-transitory computer-readable medium, according to the description, has instructions embedded thereon for operating a global navigation satellite system (GNSS) receiver of a mobile device, the instructions comprise computer code for determining that the mobile device has entered a traffic tunnel, and turning off the GNSS receiver based, at least in part, on (i) the determination that the mobile device has entered the traffic tunnel, and (ii) a determined traffic tunnel length, or an estimated amount of time that the mobile device will be in the traffic tunnel, or a combination thereof. The instructions further comprise computer code for determining that the mobile device has exited the traffic tunnel; and turning on the GNSS receiver based on the determination that the mobile device has exited the traffic tunnel.

The non-transitory computer-readable medium can further have one or more of the following features. The instructions may further comprise computer code for making the determination that the mobile device has entered the traffic tunnel based on: a determination that a GNSS signal strength received by the GNSS receiver is below a threshold signal strength level, a determined location of the mobile device with respect to map data, data received from an optical sensor, or a determined speed at which the mobile device is traveling, or any combination thereof. The instructions may further comprise computer code for making the determination that the mobile device has entered the traffic tunnel further based on the data received from the optical sensor, wherein the optical sensor comprises a camera and the data received from the optical sensor comprises an image having information indicative of a location of an entrance of the traffic tunnel. The instructions may further comprise computer code for making the determination that the mobile device has entered the traffic tunnel further based on the data received from the optical sensor, wherein the data is indicative of a change in ambient light. The instructions may further comprise computer code for determining the speed at which the mobile device is traveling by receiving information from a vehicle in which the mobile device is traveling, the information indicative of the speed at which the vehicle is traveling.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Various example techniques are provided herein which may be implemented at a mobile device to support GNSS receiver power management, at least in part, by enabling the mobile device to turn the GNSS receiver off under certain conditions when entering a traffic tunnel.

As previously noted, a mobile device (e.g., a mobile phone, a tablet or other mobile computer, a portable gaming device, a personal media player, a personal navigation device, or other electronic device) can consume large amounts of battery power in very weak or no GNSS signal environments in an attempt to acquire GNSS signals. (As used herein, the term "GNSS" can include any of a variety of satellite positioning system (SPS) technologies, including global positioning system (GPS), Galileo, GLONASS, and/or other satellite technologies. Additional examples of satellite technologies are described herein below.) In the case of traffic tunnels, traffic issues can cause traffic to move slowly, if at all, inside the tunnel. This can result in severe battery drain by the GNSS receiver of a mobile device while the mobile device is in a traffic tunnel.

The techniques described herein provide for power management of a GNSS receiver entering a traffic tunnel by leveraging information from various sources, turning off the GNSS receiver of the mobile device when the mobile device enters the tunnel, and back on once it exits. In particular, the mobile device can leverage map information to determine traffic tunnel length, and turn off the GNSS receiver based, at least in part, on a determination that the mobile device has entered the traffic tunnel, and the determined traffic tunnel length. This can reduce power consumption of battery-powered mobile devices and/or the cars with which they are connected. For example, these techniques can save power for electric self-driving cars with built-in navigation systems when travelling inside traffic tunnels. Such techniques may be used in other applications, including, without limitation, drones entering and exiting a warehouse, a mobile device entering and exiting an indoor venue (such as a shopping mall, stadium, subway station, etc.), and the like.

Figure 1:
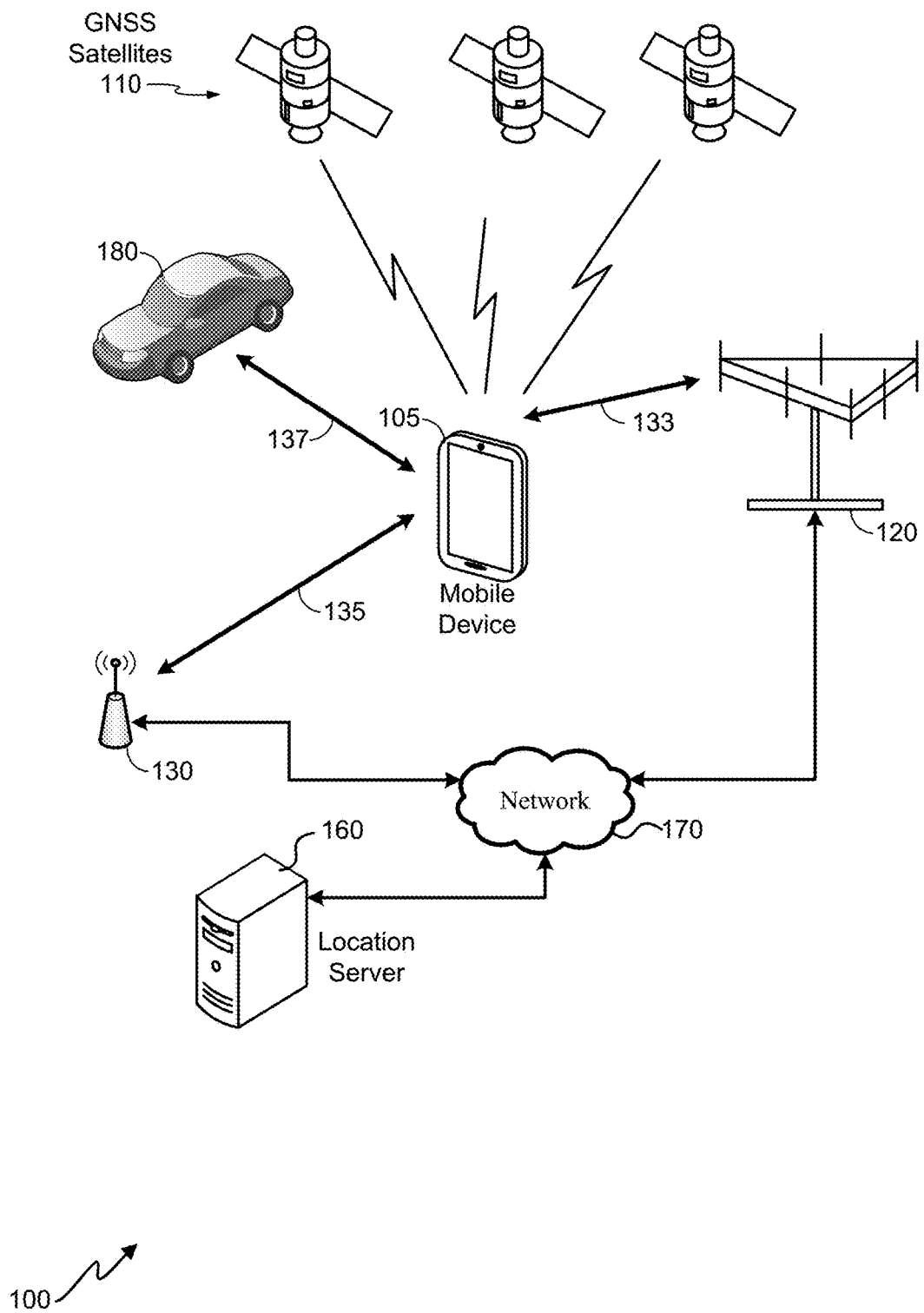
FIG. 1 is a simplified illustration of a positioning system in which a mobile device (and/or other components of the positioning system) can use the techniques provided herein for power management of a GNSS receiver, according to an embodiment.

FIG. 1 is a simplified illustration of a positioning system 100 in which a mobile device 105 and/or other components of the positioning system 100 can use the techniques provided herein for GNSS receiver power management, according to an embodiment. The techniques described herein may be implemented by one or more components of the positioning system 100; the mobile device 105 in particular. The positioning system can include a mobile device 105, vehicle 180, GNSS satellite vehicles (SVs) 110, base station 120, access point (AP) 130, location server(s) 160, and network 170. It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may be utilized in the positioning system 100. Similarly, the positioning system 100 may include many base stations 120 and/or APs 130. In some embodiments, a positioning system 100 may omit one or more of the components, such as the AP 130 for example. The illustrated connections that connect the various components in the positioning system 100 comprise data connections which may include additional (intermediary) components, direct or indirect physical and/or wireless connections, and/or additional networks. Furthermore, components may be rearranged, combined, separated, substituted, and/or omitted, depending on desired functionality. A person of ordinary skill in the art will recognize many modifications to the components illustrated.

Depending desired functionality, the network 170 may comprise any of a variety of data networks. The network 170 can, for example, comprise any combination of public and/or private networks, local and/or wide-area networks, and the like. As such, the network 170 may utilize one or more wired and/or wireless communication technologies. In some embodiments, the network 170 may comprise a cellular or other mobile network provider, a wireless local area network (WLAN), a wireless wide-area network (WWAN), and/or the Internet, for example.

The base station 120 is communicatively coupled to the network 170. In some embodiments, the base station 120 may be owned, maintained, and/or operated by a cellular network, which may employ any of a variety of wireless technologies, as described herein below with regard to FIG. 5. Depending on the technology of the network 170, the base station 120 may comprise a node B, an Evolved Node B (eNodeB or eNB), a base transceiver station (BTS), radio base station (RBS), or the like. Thus, the mobile device 105 can send and receive information with network-connected devices, such as the location server 160, by accessing the network 170 via the base station 120 using a first communication link 133. Additionally or alternatively, because an AP 130 also may be communicatively coupled with the network 170, the mobile device 105 may communicate with Internet-connected devices using a second communication link 135.

According to embodiments herein, the mobile device 105 may be communicatively connected with the vehicle 180 via a communication link 137. More specifically, the mobile device 105 may communicate with an on-board computer system of the vehicle 180 using any of a variety of standard protocols for doing so (e.g., Controller Area Network (CAN), Local Interconnect Network (LIN), etc.). The communication link 137 may, for example, comprise a physical communication link (such as a physical docking station) or a wireless communication link (such as a Bluetooth®, Wi-Fi®, etc.). In some embodiments, a wireless communication link may be automatically established between the mobile device 105 and the vehicle 180 when the mobile device 105 is determined to be near or inside the vehicle 180. As described in further detail below, the vehicle 180 may provide information from various sensor systems of the vehicle (such as one or more cameras, motion sensors, speed sensors, and the like) to enable the mobile device 105 to perform the functionality provided herein.

It can further be noted that alternative embodiments may omit and/or replace the vehicle 180 and/or mobile device 105, depending on desired functionality. That is, because the techniques for GNSS receiver power management described herein may be used in various applications, these components may be modified or replaced as needed. For example, the mobile device 105 may be integrated into an in-vehicle system (IVS) of the vehicle 180, in which case the mobile device may not be a separate component from the vehicle 180, but instead the functions described herein as being performed by the mobile device 105 may be performed by the IVS of a vehicle. Such applications may be particularly important in applications where the vehicle comprises a battery-powered vehicle (such as a battery-powered drone) and preserving the battery life of the vehicle 180 may be a concern. In some embodiments, the mobile device 105 may be carried by a pedestrian and may therefore not communicate with a vehicle 180. With these varying embodiments in mind, the embodiments described herein referring to a "mobile device" can comprise a mobile phone or other small portable device (which may be traveling in a vehicle) as well as a larger mobile device, such as a vehicle itself. A person of ordinary skill in the art will recognize various other alterations to the positioning system 100 illustrated in FIG. 1.

An estimated position of the mobile device 105, also referred to herein as a "position fix" (which can comprise a determination of the mobile device's latitude and longitude, in absolute or relative coordinates), can be used in a variety of applications. For example, the mobile device 105 may execute one or more software applications that request the position fix of the mobile device 105 periodically, based on a triggering event, based on a particular schedule, etc. These software applications include, for example, applications directed toward navigation, tracking user activity and/or exercise, customizing search results based on user location, and the like. In some embodiments, a first portion of the mobile device 105 may determine the position fix (such as lower-level hardware, firmware, and/or software, operating system, or the like) and provide the position fix to a second portion of the mobile device 105 (such as a software application).

The determination of a location of the mobile device 105, can be made by the positioning system 100 in any of a variety of ways, which may be situation specific. The position fix of the mobile device 105 may be determined by the mobile device 105 itself and/or one or more other devices within the positioning system 100. For example, the mobile device 105 may have a GNSS receiver that allows it to calculate a position fix for the mobile device 105 based on signals received by the GNSS satellites 110. The calculated position fix based on the signals received by the GNSS satellites 110 may further be based on information received by the location server 160, which can provide information that may reduce the amount of time it takes to make this position fix. Additionally or alternatively, a position may be determined by signals received from the base station 120 and/or the AP 130 (collectively referred to herein as "terrestrial transceivers"). In particular, a distance between the mobile device 105 and these terrestrial transceivers may be determined and the location of the mobile device 105 may be calculated (e.g., using trilateration) by the location server 160 and/or the mobile device 105 based on known locations of the terrestrial transceivers. These known locations may be stored on the location server 160, and, in some embodiments, may be downloaded to the mobile device 105. Thus the mobile device 105 and/or at the location server 160 may determine the position fix of the mobile device 105. Techniques for determining a position fix of the mobile device 105 may additionally or alternatively involve dead reckoning, in which visual, motion, and/or other sensor data from the mobile device 105 may be used to determine an estimated position of the mobile device 105.

Figure 2:
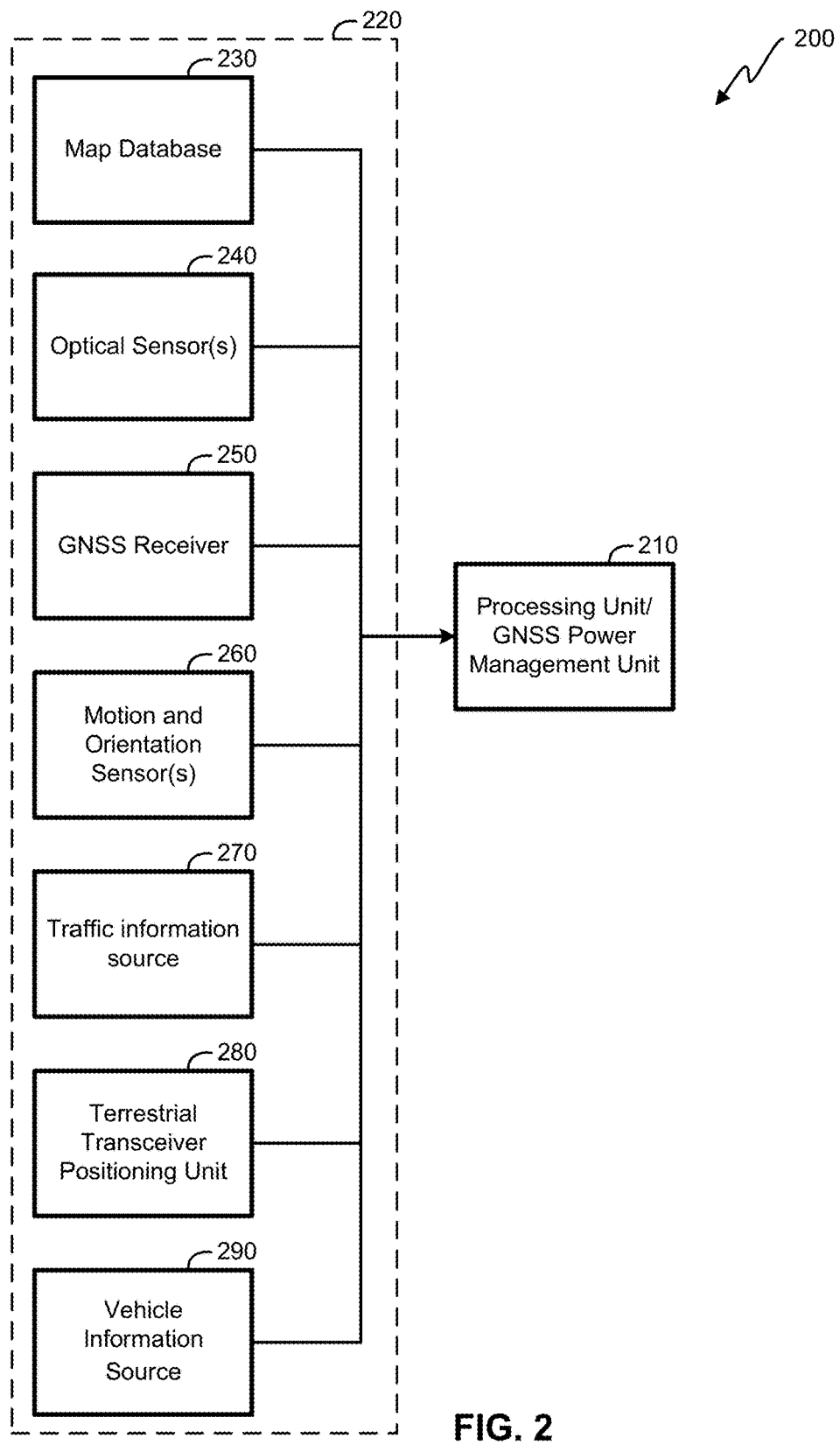
FIG. 2 is a simplified block diagram illustrating how, according to an embodiment, a GNSS power management unit of a mobile may utilize various information sources to determine when to turn the GNSS receiver on or off.
Figure 6:
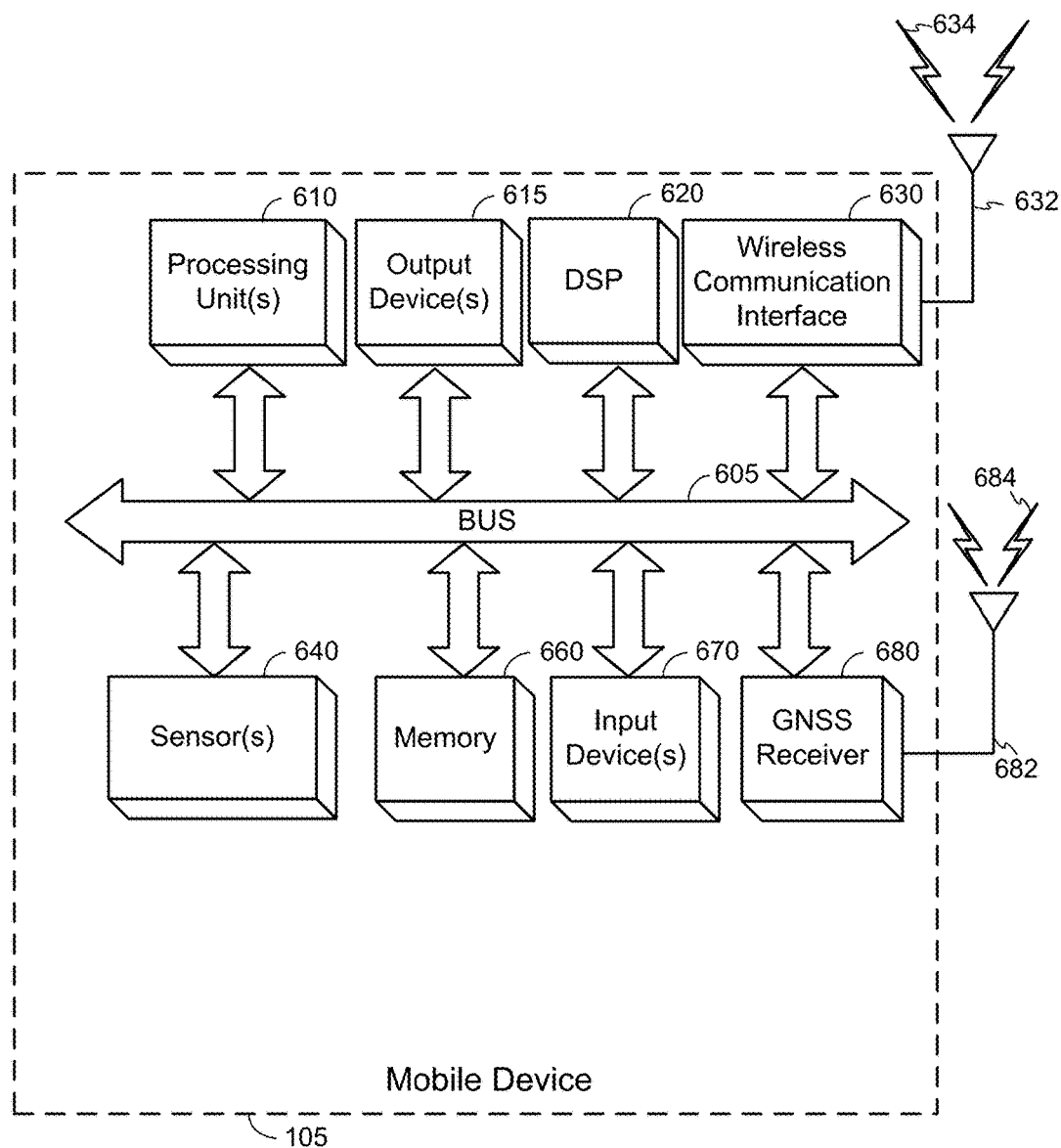
FIG. 6 is a block diagram an embodiment of a mobile device, according to an embodiment.

FIG. 2 is a simplified block diagram illustrating how, according to an embodiment, a processing unit/GNSS power management unit 210 of a mobile device (such as the mobile device 105 illustrated in FIG. 1) may utilize various information sources 220 to determine when to turn the GNSS receiver 250 on or off, as described in further detail below. Broadly speaking, the information sources 220 can provide various types of data, such as location of the mobile device, GNSS SV signal strength, number of GNSS SVs tracked, traffic data, map data, tunnel length, speed of travel, traffic information, visual (or optical) information, and the like, which can be used in determining when to turn the GNSS receiver 250 on or off. Here, the processing unit/GNSS power management unit 210 may be implemented by hardware and/or software components of the mobile device. (Example hardware and/or software components of a mobile device are illustrated in FIG. 6 and described in more detail below.) In some embodiments, the processing unit/GNSS power management unit 210 may be incorporated into the mobile device's position determination unit. In some embodiments, the processing unit/GNSS power management unit 210 may be implemented by a processing unit of the mobile device. In some embodiments, the processing unit/GNSS power management unit 210 may be implemented by hardware and/or software separate from the processing unit. The information sources 220 may also be implemented by hardware and/or software components of the mobile device, and/or may be sources external to the mobile device.

The map database 230 may comprise a database (or other data structure) having detailed map information regarding roads, tunnels, buildings, and/or other structures in a geographical region in which the mobile device is located. This map information may include, among other things, accurate information regarding entry and exit points and/or geographical boundaries of a traffic tunnel, building, or other structure in which a mobile device may not reliably receive signals from GNSS satellites. In some embodiments, the information in the map database 230 may be determined through crowdsourcing data from a plurality of mobile devices. Among other things, the map database 230 may be used to determine a length of a traffic tunnel or establish a geo-fence of the boundaries of the traffic tunnel or other structure.

The optical sensor(s) 240 may comprise one or more optical sensors of the mobile device and/or a vehicle with which the mobile device is communicatively coupled. In some embodiments, for example, the optical sensor(s) 240 may include a camera configured to capture images of objects surrounding the vehicle. In embodiments where the vehicle comprises an automobile, the camera may be configured to capture images of traffic signs and/or other objects that may indicate the position of a traffic tunnel and/or other structure that may obstruct GNSS signals. Additionally or alternatively, the optical sensor(s) 240 may comprise an ambient light detector (e.g., a camera, photodiode, and/or other light sensor) configured to detect changes in the ambient light (such as luminosity and/or hue) that may be indicative of the mobile device's entry into and/or exit from a traffic tunnel.

Figure 3:
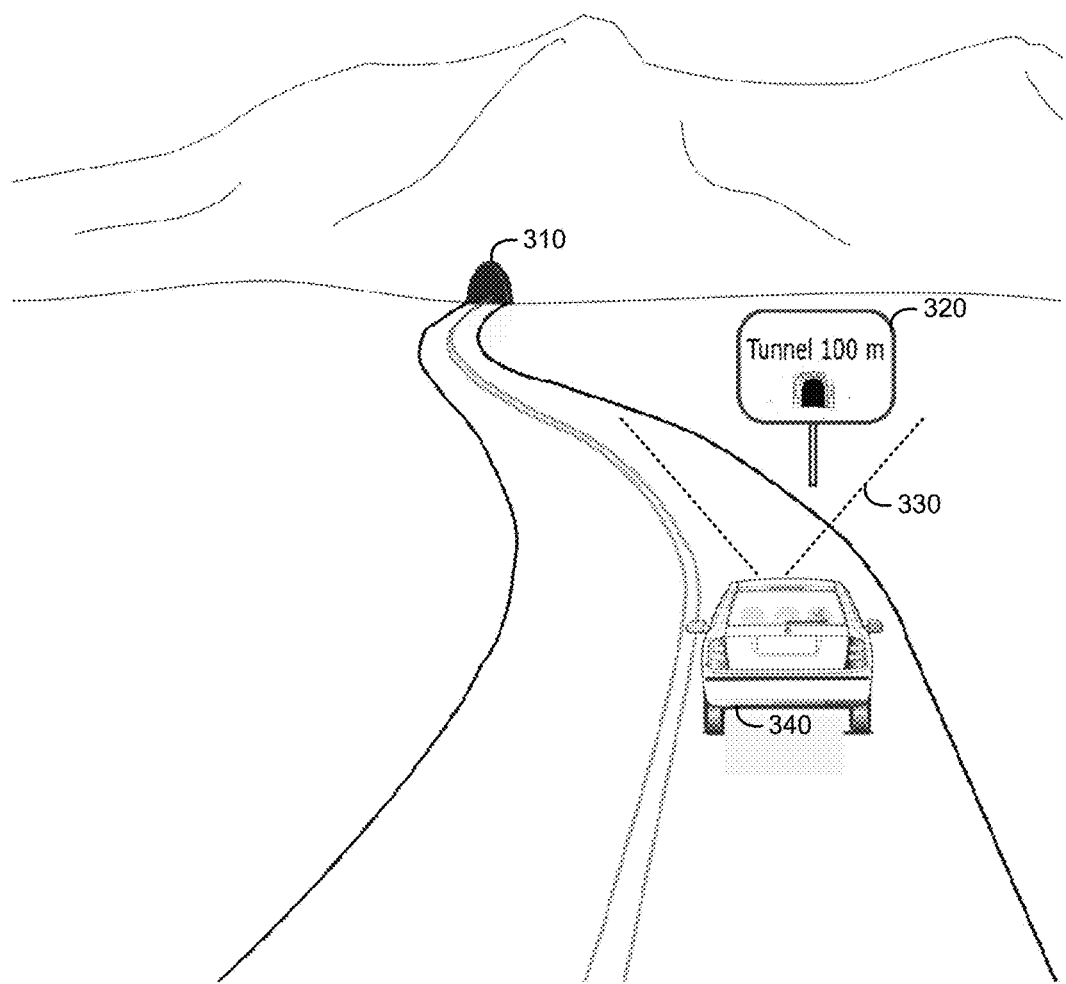
FIG. 3 is a simplified drawing illustrating how input from a camera may be utilized to determine when a vehicle (or mobile device therein) has entered a tunnel, according to an embodiment.

FIG. 3 is a simplified drawing illustrating how input from a camera may be utilized by a processing unit/GNSS power management unit 210 (of FIG. 2) to determine when a vehicle 340 (and/or mobile device therein) has entered a tunnel 310, according to an embodiment. In particular, a camera may be oriented such that its field of view (indicated by dotted lines 330) is front facing, with respect to the vehicle 340. This camera may be a camera incorporated into the vehicle 340 (e.g., as part of an autonomous or semi-autonomous driving system, warning system, or other system of the vehicle 340), or may be a camera of a separate mobile device that is simply positioned within the vehicle such that it is forward facing. The camera can then capture images of traffic signs and/or other objects providing an indication of when the tunnel 310. In the example of FIG. 3, the camera may capture an image of traffic sign 320. This image may be provided to the processing unit/GNSS power management unit 210 (or similar processing structure), which may use image processing and learning algorithms to extract the text of the traffic sign 320, determine that the text is indicative of the location of the tunnel entry, and further determine an estimated location of the tunnel entry, based on the text. Similarly, the camera may be used inside the tunnel 310 to capture images of any traffic signs therein that may be indicative of the location of an exit of the tunnel 310. The location of the entry and/or exit of the tunnel 310, as determined from one or more camera images, can be used by the processing unit/GNSS power management unit 210 to determine when to power the GNSS receiver 250 on and/or off.

Turning again to FIG. 2, the GNSS receiver 250 can provide the mobile device with GNSS positioning capabilities as described above with regard to FIG. 1. (The GNSS receiver 250 may also correspond to the GNSS receiver 680 shown in FIG. 6 and described in further detail below.) Accordingly, the processing unit/GNSS power management unit 210 may use a position fix provided by the GNSS receiver 250 to determine where the mobile device may be on a map and/or whether the mobile device has entered a traffic tunnel (or other structure with limited GNSS reception therein). Additionally or alternatively, the processing unit/GNSS receiver 250 may provide the processing unit/GNSS power management unit 210 with an indication of a received strength (e.g., a signal-to-noise ratio (SNR) or similar indication) of received signals from one or more GNSS satellite vehicles. According to some embodiments, the processing unit/GNSS power management unit 210 may use the indication of the received signal strength from the GNSS receiver 250 to determine whether the mobile device has entered a traffic tunnel and/or whether to power off the GNSS receiver 250. In some embodiments, the GNSS receiver 250 may additionally or alternatively, provide a number of GNSS satellite vehicles (SVs) that are detected or tracked, which can be used as an additional or alternative metric for determining entry into a traffic tunnel.

The motion and orientation sensor(s) 260 may, depending on desired functionality, comprise any of a variety of sensors capable of determining a motion and/or orientation of the mobile device. This may include, without limitation, one or more Inertial Measurement Units (IMUs), such as accelerometers, gyroscopes, altimeters, magnetometers, compasses and the like. Such data can be used, among other things, for a location determination using dead reckoning.

The traffic information source 270 can provide information regarding traffic that may impact the movement of the mobile device. In embodiments where the mobile device (e.g., a vehicle) is traveling on a public street, this information (e.g. as obtained via cameras, sensors, crowdsourced data, and the like by a private and/or government entity) may be retrieved from standard traffic information sources, via the Internet or via frequency modulated (FM) radio. In embodiments where the mobile device is not traveling on a public street (such as embodiments where the mobile device is a drone) the traffic information source may be a server or similar system that tracks the locations of a plurality of vehicles (or other mobile devices) and notifies any mobile device of congestion or other impacts in travel caused and/or experienced by one or more of the plurality of vehicles.

Terrestrial transceiver positioning unit 280 can comprise hardware and/or software of the mobile device capable of determining a position of the mobile device on data received by terrestrial transceivers (such as APs 130 and/or base stations 120 illustrated in FIG. 1). Some tunnels, for example, are equipped with repeaters (terrestrial transceivers) that can allow location determination within the tunnel using trilateration, crowdsourcing, and/or other techniques. In some embodiments, the terrestrial transceiver positioning unit 280 may include an antenna, wireless communication interface, processing unit, and memory, as described in the embodiment of a mobile device illustrated in FIG. 6. Similar to the GNSS receiver 250, the terrestrial transceiver positioning unit 280 can provide a location of the mobile device, which may be used by the processing unit/GNSS power management unit 210 to determine whether the mobile device has entered and/or exited a traffic tunnel (or other structure limiting GNSS signal reception therein). Other indicia of the location of the mobile device (e.g., dead reckoning using motion and orientation sensor(s) 240, a position fix based on data from the GNSS receiver 250, etc.) can be used additionally or alternatively.

Vehicle information source 290 may be information (in addition to any other information sources 220) that is collected and provided by the vehicle (which, again, may comprise the mobile device or maybe separate from the mobile device, depending on desired functionality). This can comprise, without limitation, output from a speedometer, odometer, radar system, light detection and ranging (LIDAR) system, and/or information from other vehicle sensors and systems that may be used by the processing unit/GNSS power management unit 210 to determine a location of the mobile device.

For its part, the processing unit/GNSS power management unit 210 can use information from the various information sources 220 to cause the GNSS receiver 250 to enter an on or off state. An illustration of a state machine for the GNSS receiver 250 is provided in FIG. 4.

Figure 4:
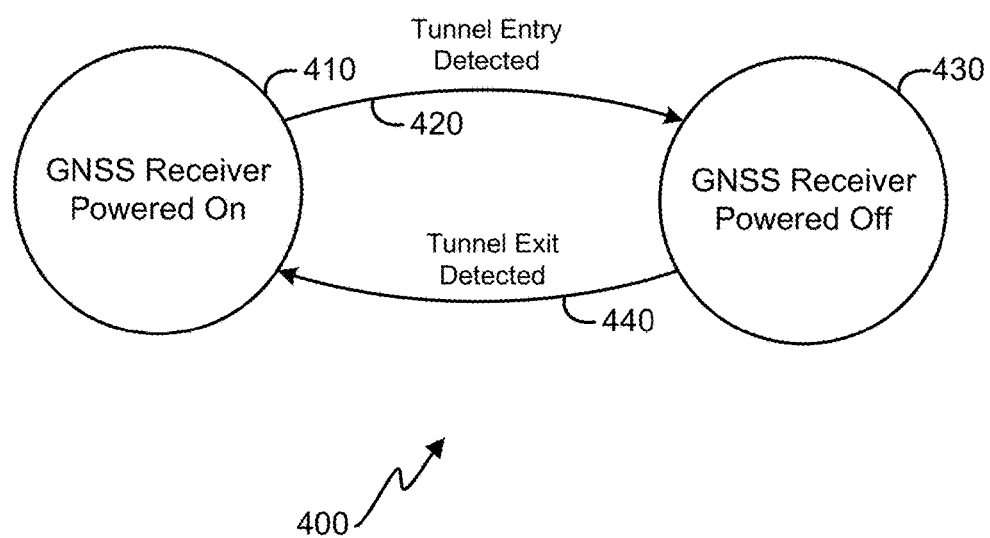
FIG. 4 is an illustration of a state machine illustrating how a GNSS power management unit may power a GNSS receiver on and off, according to an embodiment.

FIG. 4 is an illustration of a state machine 400 illustrating how a GNSS power management unit (such as the processing unit/GNSS power management unit 210 of FIG. 2) may power a GNSS receiver on and off, according to an embodiment. It should be noted that, although the state machine 400 and the description below are provided in the context of a mobile device entering and exiting a traffic tunnel, embodiments are not so limited. As previously mentioned, embodiments may additionally or alternatively include a mobile device comprising a drone or other automated vehicle (among other things) and/or a structure other than a traffic tunnel that may reduce the capability of the mobile device to receive GNSS signals.

At state 410, the GNSS receiver is powered on. As previously mentioned, the GNSS receiver may be incorporated into a mobile device that is in communication with (or itself incorporated into) a vehicle in which the device is traveling. Because it is powered on, the GNSS receiver may receive signals from GNSS satellites, which may be used by the mobile device to provide a position fix of the mobile device. The position fix may be used by a navigation and/or other application executed by the mobile device. The mobile device may stay in the GNSS receiver powered on state 410 until a tunnel entry is detected.

While in the GNSS receiver powered on state 410, the mobile device can execute functionality to determine whether or not it has entered the tunnel. As described above with regard to FIG. 2, this can mean receiving information from any of a variety of information sources including a map database, optical sensors, GNSS receiver, motion and orientation sensors, traffic information source, terrestrial transceiver positioning unit, vehicle information source, and the like. With this information, a mobile device can make a determination as to whether it has detected traffic tunnel entry by the mobile device.

Furthermore, depending on desired functionality, the mobile device may provide different weights to different information sources and/or data provided by the information sources. For example, the mobile device may receive input from optical sensors that, when compared with a map of the map database, indicates the mobile device has entered a traffic tunnel. However, the mobile device may also receive a position fix based on information from a GNSS receiver that suggests the mobile device is not in the traffic tunnel. But because a position fix based on information from a GNSS receiver may not be reliable at or near the entry point of the tunnel, the mobile device may ignore or give little weight to the position fix based on the information from the GNSS receiver and give greater weight to the information from the optical sensors. Different embodiments and scenarios may implement other types of information source and/or data weighting, depending on desired functionality.

Once, in view of the data from the different information sources, the tunnel entry is detected (e.g., the mobile device has determined that it has entered a traffic tunnel and/or the likelihood of traffic tunnel entry is above a certain confidence threshold) as indicated by transition 420, the GNSS receiver enters a powered off state 430.

Similar to the GNSS receiver powered on state 410, a mobile device may continue to determine its location and/or determine when the mobile device has exited the tunnel in the GNSS receiver powered off state 430. Depending on applicability, many of the same information sources used to determine entry into the traffic tunnel may also be used to determine exit from the traffic tunnel, including the map database, optical sensors, traffic information sources, motion and orientation sensors, terrestrial transceiver positioning unit, vehicle information, and the like.

One particular function that can be helpful in determining exit from the traffic tunnel is a determination of the length of the traffic tunnel. As previously indicated, maps are becoming increasingly accurate as a result, at least in part, of a continued progress toward semi- and fully-automated automobiles. These "high definition" or HD maps can be used to accurately determine not only the locations of a traffic tunnel entry and exit, but also the length of the traffic tunnel. As such, a mobile device may (e.g., when it is determined to be within a threshold distance from the traffic tunnel) use these maps to calculate the length of the traffic tunnel. This can be used along with an expected and/or actual speed of the mobile device through the traffic tunnel to determine a length of time that GNSS receiver of the mobile device can be in the powered off state 430. (An expected speed of the mobile device through the traffic tunnel can be estimated, for example, from the speed limit, the measured speed of traffic in or near the traffic tunnel, and/or the mobile device's current speed of travel, which may be respectively provided by a map database, traffic information source, and vehicle information source (e.g., speedometer). Additionally or alternatively, the speed of the vehicle—inside or outside a traffic tunnel—may be determined based on information obtained from an IMU, an optical sensor, or any combination thereof.) Such functionality can be particularly helpful when there is limited data from other information sources to determine whether the mobile device has exited the tunnel. (Additionally or alternatively, in the circumstances there is limited data from other information sources, embodiments may provide for periodically turning the GNSS receiver on to determine whether signals from GNSS satellites are sufficient for GNSS operation, in which case the GNSS receiver can be left on.)

As an example, a mobile device may estimate a time at which it will exit from the traffic tunnel by calculating the time, T, spent in the traffic tunnel as follows:

$$T=L/S \quad (1)$$

where L is the length of the traffic tunnel and S is the expected average speed inside the tunnel. If the tunnel length is small (say, less than 500 m, for example) and traffic speed is normal (e.g., within +/−5 mph of the speed limit), then the mobile device may remain in the GNSS receiver powered on state 410. But if, in this example, traffic speed is slow (e.g., below the speed limit by a threshold percentage or absolute amount) due to an accident or lane closure (e.g., less than 25 mph when speed limit is 45 mph), then the GNSS receiver may enter powered off state 430 to save power.

As indicated by transition 440, once it is determined that the mobile device has exited the tunnel, the mobile device can once again enter the GNSS Receiver powered on state 410.

Figure 5:
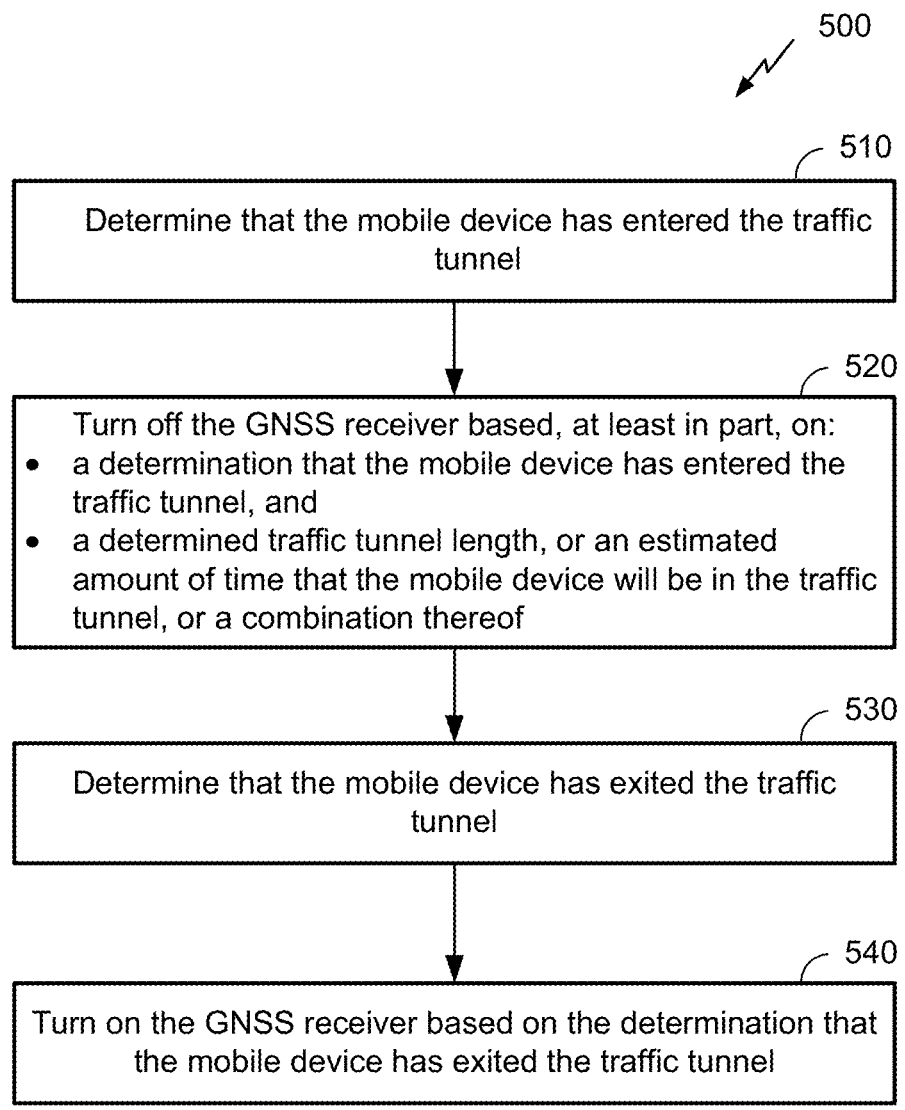
FIG. 5 is a flow diagram illustrating a method of operating a GNSS receiver of a mobile device, according to an embodiment.

FIG. 5 is a flow diagram 500 illustrating a method of operating a GNSS receiver of a mobile device, according to an embodiment. Means for performing one or all of the functions illustrated in the flow diagram 500 can include hardware and/or software components of a mobile device (e.g., the processing unit/GNSS power management unit 210 of FIG. 2 and/or one or more of the software and/or hardware components shown in FIG. 6 and described in more detail below).

At block 510, it is determined that the mobile device has entered the traffic tunnel. As indicated in the embodiments described previously, this determination can be made based on data received from any of a variety of information sources. According to some embodiments, for example, the determination that the mobile device has entered the traffic tunnel may be based on a determined that a GNSS signal strength received by the GNSS receiver is below a threshold signal strength level, a determined location of the mobile device with respect to the map data, data received from an optical sensor, a determined speed at which the mobile device is traveling, or any combination thereof.

A determination that the mobile device has entered the traffic tunnel based on data received by an optical sensor may vary, depending on the type of optical sensor, desired functionality, and/or the particular situation. For example, in embodiments where the optical sensor comprises a camera, data received from the optical sensor can comprise an image of a traffic sign having information indicative of a location of an entrance of the traffic tunnel. This information can be used in the determination that the mobile device has entered the traffic tunnel. Additionally or alternatively, the optical sensor (which may be a camera, photo diode, or other type of optical sensor) may provide data indicative of a change in ambient light (e.g., a change of hue and/or luminosity beyond a certain percentage or threshold). Because ambient light inside a traffic tunnel is typically different than ambient light outside of a traffic tunnel, this change in ambient light may be indicative of entry into a traffic tunnel. Data from optical sensors can be used similarly in a determination that the mobile device has exited the traffic tunnel. In some embodiments ambient light measured before tunnel entry can be used as a reference with which subsequent light measurements may be compared to help determine tunnel exit.

Means for performing the functionality at block 510 can include the processing unit(s) 610, bus 605, sensor(s) 640, GNSS Receiver 680, wireless communication interface 630, DSP 620, and/or memory 660 of a mobile device 105 illustrated in FIG. 6 and described in more detail below.

At block 520, the GNSS receiver is turned off based, at least in part, on (i) a determination that the mobile device has entered the traffic tunnel, and (ii) a determined traffic tunnel length, or an estimated amount of time that the mobile device will be in the traffic tunnel, or a combination thereof. An amount of time that the mobile device will be in the traffic tunnel can be estimated based on a variety of factors, such as a determined average speed of traffic inside the traffic tunnel (e.g., as reported by traffic control and/or monitoring agencies, crowdsourcing traffic applications, etc.), a current and/or expected velocity of the mobile device, and the like.

As indicated above, a traffic tunnel length can be determined, for example, using map data. In some embodiments, the GNSS receiver may not be turned off unless the traffic tunnel has at least a threshold traffic tunnel length. This threshold traffic tunnel length may be static or dynamic, depending on desired functionality. In embodiments where the threshold traffic tunnel length is dynamic, it may be calculated based on factors that may impact the need to provide a position fix inside the traffic tunnel along with the ability to do so. Such factors may include, for example, a determined average speed of traffic inside the traffic tunnel, a frequency in which the mobile device is to provide a location fix (which may be set by an application executed by the mobile device, for example), and/or other factors. As such, turning off the GNSS receiver may be further based on any combination of these factors.

Means for performing the functionality at block 520 can include the processing unit(s) 610, bus 605, GNSS receiver 680, and/or memory 660 of a mobile device 105 illustrated in FIG. 6 and described in more detail below.

At block 530 it is determined that the mobile device has exited the traffic tunnel. As previously indicated, a mobile device may use any of a variety of information sources (other than the GNSS receiver) to determine whether the mobile device has exited the traffic tunnel. This information can include, data received from an optical sensor (as described above with regard to the determination that the mobile device has entered the traffic tunnel), a location determination based on radio frequency (RF) signals received from one or more terrestrial transceivers (e.g., APs, and/or cellular base stations), data received from one or more motion sensors (which may indicate acceleration/deceleration or other movement that may impact a determination of how long the mobile device is expected to be in the traffic tunnel), or any combination thereof. Means for performing the functionality at block 530 can include the processing unit(s) 610, bus 605, sensor(s) 640, GNSS Receiver 680, wireless communication interface 630, DSP 620, and/or memory 660 of a mobile device 105 illustrated in FIG. 6 and described in more detail below.

At block 540, the GNSS receiver is turned on based on the determination that the mobile device has exited the traffic tunnel. Accordingly, the mobile device can resume normal operation of the GNSS receiver for location fixes and/or other information. Means for performing the functionality at block 540 can include the processing unit(s) 610, bus 605, GNSS receiver 680, and/or memory 660 of a mobile device 105 illustrated in FIG. 6 and described in more detail below.

FIG. 6 illustrates an embodiment of a mobile device 105, which can be utilized in the embodiments and/or incorporated into a vehicle, as described in the embodiments provided herein. FIG. 6 is meant only to provide a generalized illustration of various components, any or all of which may be included or omitted as appropriate. It can be noted that, in some instances, components illustrated by FIG. 6 can be localized to a single physical device and/or distributed among various networked devices, which may be disposed at different physical locations. The apparatus may be configured to execute one or more functions of the methods described herein, such as the methods corresponding to the functionality described in relation to FIGS. 2-5.

The mobile device 105 is shown comprising hardware elements that can be electrically coupled via a bus 605 (or may otherwise be in communication, as appropriate). The hardware elements may include a processing unit(s) 610 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 6, some embodiments may have a separate DSP 620, depending on desired functionality. The mobile device 105 also may comprise one or more input devices 670, which may comprise without limitation one or more touch screens, touch pads, microphones, buttons, dials, switches, and/or the like; and one or more output devices 615, which may comprise without limitation, one or more displays, light emitting diode (LED)s, speakers, and/or the like.

The mobile device 105 might also include a wireless communication interface 630, which may comprise without limitation a modem, a network card, an infrared communication device, a wireless communication device, and/or a chipset (such as a Bluetooth (or BLE) device, an IEEE 802.11 device, an IEEE 802.15.4 (or ZIGBEE) device, a WIFI device, a WiMAX device, cellular communication facilities, etc.), and/or the like. The wireless communication interface 630 may permit data to be communicated with a network, vehicle, a location server, wireless access points, other computer systems, and/or any other electronic devices described herein. The communication can be carried out via one or more wireless communication antenna(s) 632 that send and/or receive wireless signals 634.

Depending on desired functionality, the wireless communication interface 630 may comprise separate transceivers to communicate with different devices, which may be on different networks. These different data networks may comprise various network types. A wireless wide area network (WWAN), for example, may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 105 can further include sensor(s) 640. Such sensors may comprise, without limitation, one or more accelerometer(s), gyroscope(s), camera(s), magnetometer(s) and/or other compass(es), altimeter(s), microphone(s), proximity sensor(s), light sensor(s), and the like. Such sensors may, for example, be utilized as described herein for position determination (e.g., dead reckoning) and/or other functionality.

Embodiments of the mobile device 105 may also include a global navigation satellite system (GNSS) receiver 680 capable of receiving signals 684 from one or more GNSS satellites using an GNSS antenna 682, and being powered on and off in the manner described in the embodiments provided herein. Such positioning can be utilized to complement and/or incorporate the techniques described herein. The GNSS receiver 680 can extract a position of the mobile device 105, using conventional techniques, from GNSS satellite vehicles (SVs) of an GNSS system, such as Galileo, GLONASS, Compass, Quasi-Zenith Satellite System (QZSS) over Japan, Indian Regional Navigational Satellite System (IRNSS) over India, Beidou over China, and/or any other satellite positioning system (SPS). Moreover, the GNSS receiver 680 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an GNSS may include any combination of one or more global and/or regional navigation satellite systems and/or augmentation systems, and GNSS signals may include GNSS, GNSS-like, and/or other signals associated with such one or more GNSS.

The mobile device 105 may further include and/or be in communication with a memory 660. The memory 660 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. This memory 660 may be used to store the map data (e.g., in a map database or other data structure) as described herein.

The memory 660 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as computer code and/or instructions executable by the mobile device 105 (and/or a processing unit within a mobile device 105). In an aspect, then, such code and/or instructions can be used to configure and/or adapt a general purpose computer (or other device) to perform one or more operations in accordance with the described methods. The memory 660 may therefore comprise non-transitory machine-readable media having the instructions and/or computer code embedded therein/thereon. Common forms of computer-readable media include, for example, magnetic or optical media, a RAM, a PROM, EPROM, a FLASH-EPROM, any other memory chip or cartridge, a carrier wave as described hereinafter, or any other medium from which a computer can read instructions and/or code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of operating a global navigation satellite system (GNSS) receiver of a mobile device, the method comprising:
   determining that the mobile device has entered a traffic tunnel;
   turning off the GNSS receiver based, at least in part, on:
   (i) the determination that the mobile device has entered the traffic tunnel, and
   (ii) a determination that a length of the traffic tunnel exceeds a threshold traffic tunnel length, the threshold traffic tunnel length based on:
      a determined speed of traffic inside the traffic tunnel, or
      a frequency at which the mobile de vice is to provide a location fix, or any combination thereof;
   determining that the mobile device has exited the traffic tunnel; and
   turning on the GNSS receiver based on the determination that the mobile device has exited the traffic tunnel.

2. The method of claim 1, wherein the determination that the mobile device has entered the traffic tunnel is based on:
   a determination that a GNSS signal strength of a GNSS signal received by the GNSS receiver is below a threshold signal strength level,
   a determined location of the mobile device with respect to map data,
   data received from an optical sensor, or
   a determined speed at which the mobile device is traveling, or
   any combination thereof.

3. The method of claim 2, wherein the determination that the mobile device has entered the traffic tunnel is further based on the data received from the optical sensor, wherein the optical sensor comprises a camera and the data received from the optical sensor comprises an image having information indicative of a location of an entrance of the traffic tunnel.

4. The method of claim 2, wherein the determination that the mobile device has entered the traffic tunnel is further based on the data received from the optical sensor, wherein the data is indicative of a change in ambient light.

5. The method of claim 2, further comprising determining the speed at which the mobile device is traveling by receiving information from a vehicle in which the mobile device is traveling, the information indicative of the speed at which the vehicle is traveling.

6. The method of claim 2, further comprising determining the speed at which the mobile device is traveling based on information obtained from an Inertial Measurement Unit (IMU), the optical sensor, or any combination thereof.

7. The method of claim 1, wherein the determination that the mobile device has exited the traffic tunnel is based, at least in part, on:
   data received from an optical sensor,
   a location determination based on radio frequency (RF) signals received from one or more terrestrial transceivers,
   data received from one or more motion sensors, or
   any combination thereof.

8. The method of claim 7, wherein the determination that the mobile device has exited the traffic tunnel is further based on the data received from the optical sensor, wherein the optical sensor comprises a camera and the data received from the optical sensor comprises an image having information indicative of a location of an exit of the traffic tunnel.

9. The method of claim 7, wherein the determination that the mobile device has exited the traffic tunnel is further based on the data received from the optical sensor, wherein the data is indicative of a change in ambient light.

10. A mobile device comprising:
    a global navigation satellite system (GNSS) receiver; and
    a processing unit communicatively coupled with the GNSS receiver and configured to:
    determine that the mobile device has entered a traffic tunnel;
    cause the GNSS receiver to be turned off, based, at least in part, on:
    (i) the determination that the mobile device has entered the traffic tunnel, and
    (ii) a determination that a length of the traffic tunnel exceeds a threshold traffic tunnel length, the threshold traffic tunnel length based on:
       a determined speed of traffic inside the traffic tunnel, or
       a frequency at which the mobile device is to provide a location fix,
       or any combination thereof;
    determine that the mobile device has exited the traffic tunnel; and
    cause the GNSS receiver to be turned on, based on the determination that the mobile device has exited the traffic tunnel.

11. The mobile device of claim 10, wherein the processing unit is configured to determine that the mobile device has entered the traffic tunnel based on:
   a determination that a GNSS signal strength of a GNSS signal received by the GNSS receiver is below a threshold signal strength level,
   a determined location of the mobile device with respect to map data,
   data received from an optical sensor, or
   a determined speed at which the mobile device is traveling, or
   any combination thereof.

12. The mobile device of claim 11, wherein the processing unit is configured to make the determination that the mobile device has entered the traffic tunnel based on the data received from the optical sensor, wherein the optical sensor comprises a camera and the data received from the optical sensor comprises an image having information indicative of a location of an entrance of the traffic tunnel.

13. The mobile device of claim 11, wherein the processing unit is configured to make the determination that the mobile device has entered the traffic tunnel based on the data received from the optical sensor, wherein the data is indicative of a change in ambient light.

14. The mobile device of claim 11, wherein the processing unit is further configured to determine the speed at which the mobile device is traveling by receiving information from a vehicle in which the mobile device is traveling, the information indicative of the speed at which the vehicle is traveling.

15. The mobile device of claim 11, wherein the processing unit is further configured to determine the speed at which the mobile device is traveling based on information obtained from an Inertial Measurement Unit (IMU), the optical sensor, or any combination thereof.

16. The mobile device of claim 10, wherein the processing unit is configured to make the determination that the mobile device has exited the traffic tunnel based, at least in part, on:
   data received from an optical sensor,
   a location determination based on radio frequency (RF) signals received from one or more terrestrial transceivers,
   data received from one or more motion sensors, or
   any combination thereof.

17. The mobile device of claim 16, wherein the processing unit is configured to make the determination that the mobile device has exited the traffic tunnel further based on the data received from the optical sensor, wherein the optical sensor comprises a camera and the data received from the optical sensor comprises an image having information indicative of a location of an exit of the traffic tunnel.

18. The mobile device of claim 16, wherein the processing unit is configured to make the determination that the mobile device has exited the traffic tunnel further based on the data received from the optical sensor, wherein the data is indicative of a change in ambient light.

19. An apparatus comprising:
   means for determining that a mobile device has entered a traffic tunnel;
   means for turning off a global navigation satellite system (GNSS) receiver of the mobile device based, at least in part, on:
      (i) the determination that the mobile device has entered the traffic tunnel, and
      (ii) a determination that a length of the traffic tunnel exceeds a threshold traffic tunnel length, the threshold traffic tunnel length based on:
         a determined speed of traffic inside the traffic tunnel, or
         a frequency at which the mobile device is to provide a location fix,
         or any combination thereof;
   means for determining that the mobile device has exited the traffic tunnel; and
   means for turning on the GNSS receiver based on the determination that the mobile device has exited the traffic tunnel.

20. The apparatus claim 19, wherein the means for determining that the mobile device has entered the traffic tunnel determines that the mobile device has entered the traffic tunnel based on:
   a determination that a GNSS signal strength of a GNSS signal received by the GNSS receiver is below a threshold signal strength level,
   a determined location of the mobile device with respect to map data,
   data received from an optical sensor, or
   a determined speed at which the mobile device is traveling, or
   any combination thereof.

21. The apparatus claim 20, wherein the means for determining that the mobile device has entered the traffic tunnel determines that the mobile device has entered the traffic tunnel based on the data received from the optical sensor comprising a camera, wherein the data received from the optical sensor comprises an image having information indicative of a location of an entrance of the traffic tunnel.

22. The apparatus claim 20, wherein the means for determining that the mobile device has entered the traffic tunnel determines that the mobile device has entered the traffic tunnel based on the data received from the optical sensor, wherein the data is indicative of a change in ambient light.

23. The apparatus claim 20, further comprising means for determining the speed at which the mobile device is traveling by receiving information from a vehicle in which the mobile device is traveling, the information indicative of the speed at which the vehicle is traveling.

24. A non-transitory computer-readable medium having instructions embedded thereon for operating a global navigation satellite system (GNSS) receiver of a mobile device, the instructions, when executed by one or more processing units, cause the one or more processing units to:
   determine that the mobile device has entered a traffic tunnel;
   turn off the GNSS receiver based, at least in part, on:
      (i) the determination that the mobile device has entered the traffic tunnel, and
      (ii) a determination that a length of the traffic tunnel exceeds a threshold traffic tunnel length, the threshold traffic tunnel length based on:
         a determined speed of traffic inside the traffic tunnel, or
         a frequency at which the mobile device is to provide a location fix,
         or any combination thereof;
   determine that the mobile device has exited the traffic tunnel; and
   turn on the GNSS receiver based on the determination that the mobile device has exited the traffic tunnel.

25. The non-transitory computer-readable medium of claim 24, wherein the instructions, when executed by one or more processing units, further cause the one or more processing units to make the determination that the mobile device has entered the traffic tunnel based on:

a determination that a GNSS signal strength of a GNSS signal received by the GNSS receiver is below a threshold signal strength level,
a determined location of the mobile device with respect to map data,
data received from an optical sensor, or
a determined speed at which the mobile device is traveling, or
any combination thereof.

26. The non-transitory computer-readable medium of claim 25, wherein the instructions, when executed by one or more processing units, further cause the one or more processing units to make the determination that the mobile device has entered the traffic tunnel further based on the data received from the optical sensor, wherein the optical sensor comprises a camera and the data received from the optical sensor comprises an image having information indicative of a location of an entrance of the traffic tunnel.

27. The non-transitory computer-readable medium of claim 25, wherein the instructions, when executed by one or more processing units, further cause the one or more processing units to make the determination that the mobile device has entered the traffic tunnel further based on the data received from the optical sensor, wherein the data is indicative of a change in ambient light.

28. The non-transitory computer-readable medium of claim 25, wherein the instructions, when executed by one or more processing units, further cause the one or more processing units to determine the speed at which the mobile device is traveling by receiving information from a vehicle in which the mobile device is traveling, the information indicative of the speed at which the vehicle is traveling.

* * * * *

UNITED STATES PATENT AND TRADEMARK OFFICE
CERTIFICATE OF CORRECTION

PATENT NO. : 10,306,559 B2  
APPLICATION NO. : 15/429020  
DATED : May 28, 2019  
INVENTOR(S) : Amol Kench et al.

Page 1 of 1

It is certified that error appears in the above-identified patent and that said Letters Patent is hereby corrected as shown below:

In the Claims

In Column 17, Line 54, in Claim 1, delete "de vice" and insert -- device --, therefor.
In Column 20, Line 11, in Claim 20, after "apparatus" insert -- of --.
In Column 20, Line 24, in Claim 21, after "apparatus" insert -- of --.
In Column 20, Line 31, in Claim 22, after "apparatus" insert -- of --.
In Column 20, Line 37, in Claim 23, after "apparatus" insert -- of --.

Signed and Sealed this
Twenty-seventh Day of August, 2019

Andrei Iancu
*Director of the United States Patent and Trademark Office*